310-10 SR
FIP8502 OR 4,121,123

United States Patent [19] | [11] 4,121,123
Crolius | [45] Oct. 17, 1978

[54] EXPLOSIVELY DRIVEN PLASMA CURRENT GENERATOR

[75] Inventor: Richard L. Crolius, Rancho Palos Verdes, Calif.

[73] Assignee: The United States of America as represented by the Secretary of the Air Force, Washington, D.C.

[21] Appl. No.: 778,761

[22] Filed: Mar. 17, 1977

[51] Int. Cl.[2] ........................ H02N 4/00

[52] U.S. Cl. ........................ 310/10; 310/11; 328/1

[58] Field of Search ............... 315/111, 111.2; 310/10, 310/11; 89/8; 328/1

[56] References Cited

U.S. PATENT DOCUMENTS

| | | | |
|---|---|---|---|
| 3,113,272 | 12/1963 | Cannon et al. | 89/8 UX |
| 3,225,227 | 12/1965 | Biehl | 310/11 |
| 3,317,763 | 5/1967 | Brumfield | 310/11 |
| 3,356,869 | 12/1967 | Hilton et al. | 310/10 |
| 3,478,231 | 11/1969 | Knoepfel et al. | 310/10 |
| 3,878,409 | 4/1975 | Gill et al. | 310/11 |

*Primary Examiner*—Donovan F. Duggan
*Attorney, Agent, or Firm*—Joseph E. Rusz; Willard R. Matthews, Jr.

[57] ABSTRACT

The generation of intense burst of high energy electrons and/or intense currents of positive ions is accomplished by compressing a magnetic field in the presence of a gas plasma. The gas plasma is contained in a metallic cylinder and the magnetic field is established by means of a capacitor bank driven current that flows in the axial direction on the metallic cylinder and returns through the gas plasma contained in the cylinder. Detonation of explosive material surrounding the metallic cylinder drives the cylinder walls inward effecting compression of the magnetic field and a concomitant increase in plasma current.

2 Claims, 1 Drawing Figure

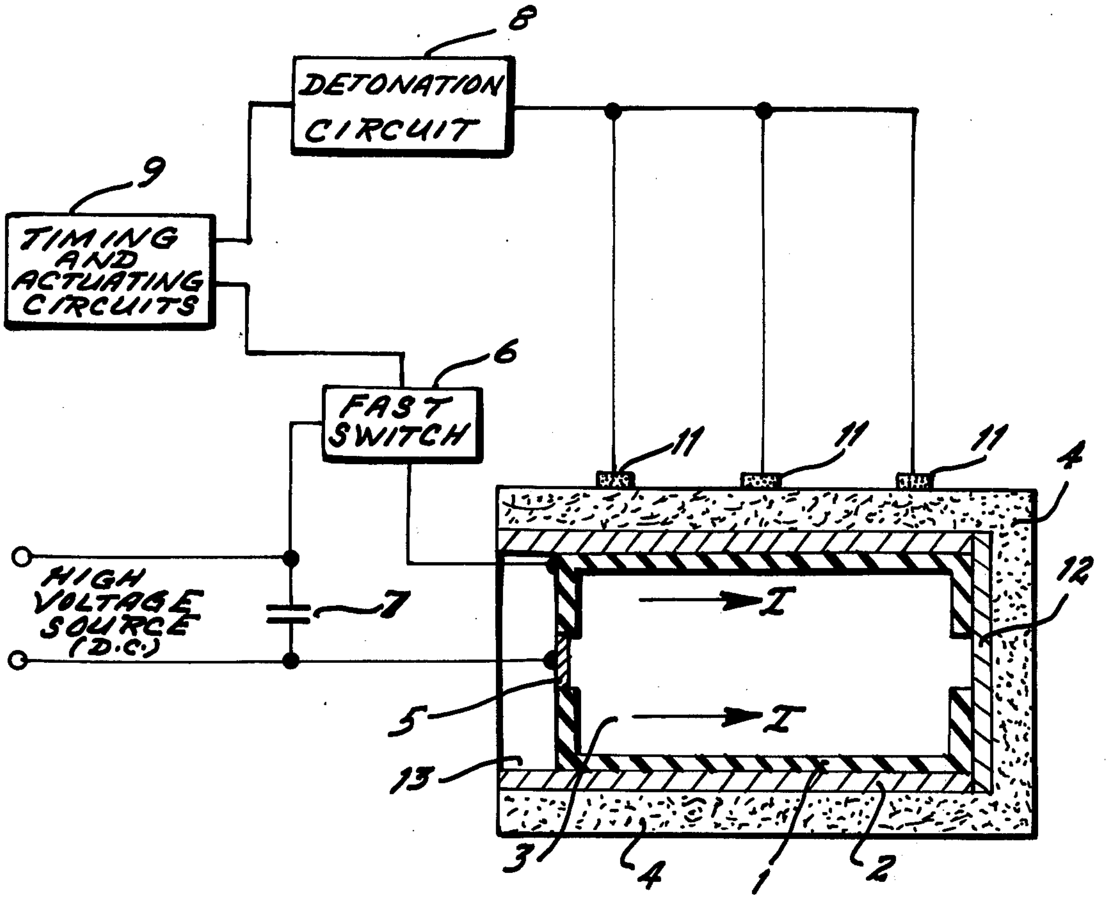
8
DETONATION CIRCUIT
9
TIMING AND ACTUATING CIRCUITS
6
FAST SWITCH
HIGH VOLTAGE SOURCE (D.C.)
7
11
11
11
4
12
I
I
5
13
3
4
1
2

EXPLOSIVELY DRIVEN PLASMA CURRENT GENERATOR

BACKGROUND OF THE INVENTION

This invention relates to sources of very high intensity pulsed electron and/or positive ion beams having pulse durations in the order of microseconds, and in particular to explosive generators adapted to the purpose.

Flash X-ray machines are commonly used to produce high intensity pulsed electron beams. However, these sources have certain intensity limits and they are generally incapable of sustaining pulse durations in the order of microseconds. They are usually driven by capacitive current sources such as coaxial Blumleins.

Explosive generators provide an alternative source of high intensity pulsed electric power. The following periodical articles describe in detail devices of this type and together these articles represent the current state of the art of explosive generators.

*Production of Very High Magnetic Fields by Implosion,* C. M. Fowler et al, Journal of Applied Physics 31 (1960) p. 588 et seq.

*Explosive-Driven Magnetic Field Compression Generators,* J. W. Shearer et al, Journal of Applied Physics 39 (1968) p. 2102 et seq.

*Megagauss Fields Generated in Explosive-Driven Flux Compression Devices,* F. Herlach and H. Knoepfel, Review of Scientific Instruments 36 (1968) p. 1088 et seq.

*Explosively-Driven High Energy Generator,* J. C. Crawford and R. A. Damerow, Journal of Applied Physics 39 (1968) p. 5224 et seq.

Explosive generators of this type are the most powerful source available for microsecond pulses of electrical energy. They are also inexpensive to construct. However, their usefulness is sometimes limited because, to date, explosive generators operate efficiently only when driving ordinary electrical currents into inductive loads.

The present invention is a further development of the explosive generator that utilizes a gas plasma and permits the high energies available in explosives (on the order of 1 MJ per pound) to be coupled directly to ion acceleration.

SUMMARY OF THE INVENTION

The invention comprehends the physical compression of a magnetic field in the presence of a gas plasma for the purpose of generating sustained high intensity pulses of electrons or positive ions. This is accomplished by the containment of gas plasma in a metallic container and the implosion of the container by explosive means. The magnetic field is established by a coaxial current flowing along a cylindrical shell and its return current flowing through plasma within the shell or in annular region surrounding the metallic cylinder.

It is a principal object of the invention to provide a new and improved explosively driven plasma current generator.

It is another object of the invention to provide a high intensity pulsed electron and/or positive ion beam source that is capable of sustaining microsecond pulse durations.

It is another object of the invention to provide a high intensity pulsed electron and/or ion beam source that is inexpensive and easy to construct.

It is another object of the invention to provide an explosive generator that is not limited in its application to driving ordinary electrical currents into inductive loads.

These, together with other objects, features and advantages of the invention, will become more apparent from the following detailed description when taken in conjunction with the illustrated embodiment in the accompanying drawing.

DESCRIPTION OF THE DRAWING

The sole FIGURE of the drawing is a sectional view of one presently preferred embodiment of the invention.

DETAILED DESCRIPTION OF THE PREFERRED EMBODIMENT

Explosive generators employ high explosives to compress established magnetic fields. By Maxwell's Laws the increased fields imply increased current. Magnetic fields can be compressed by surrounding a field filled volume with a conducting shell and explosively compressing it. Because magnetic field lines diffuse into the metal of the shell at a rate which is slow on the time scale of the explosion, this field-filled region acts like a compressible fluid.

The sole figure of the drawing illustrates an adaptation of such an explosive generator that incorporates the principles of the invention. Referring thereto, a cylindrical metallic container shell 2 having a metallic end plate 12 and a partial end plate 5 encloses a volume 3. Volume 3 is filled with an appropriate gas plasma. The plasma may be established by other means or by the discharge. The shell 2 is insulated from the plasma region 3 by insulating material 1. Explosive material 4 is disposed around the outer periphery of shell 2. In the event that a closed system is desired, explosive material may also be placed on end plate 12 and/or over the opposite end. Explosive material 4 is detonated by explosive initiators 11 and detonation circuit 8 in response to timing and activating circuits 9. The overhang region 13 is provided to close the cylinder and prevent flux ejection from the left-hand end. A magnetic field is established within volume 3 by driving the system with current I from current source 7. Current source 7 can be a high capacity fast capacitor bank. Various modifications to the illustrated structure are also comprehended by the invention. For instance, the plasma volume 3 may be an annulus surrounding cylinder 2. In that case explosive 4 may be placed within cylinder 2 or outside the plasma annulus. Also, explosive material 4 can take the form of multiple rods of explosive material that are positioned parallel with and surround shell 2. They may thus be ignited to combust uniformly from one end of the shell toward the other causing a pinch effect on the contained plasma.

In operation the magnetic field, generated by the current I in shell 2 and plasma volume 3, is compressed by the imploding shell 2. Upon detonation and compression the flux must increase with a concommitant increase in current.

In the above described arrangement an axial electric field will be felt everywhere in the plasma upon detonation of surrounding explosives and subsequent compression. Flux compression occurs everywhere inside the outer conductor so that induced currents will occur not only on the surface of the plasma column but throughout the plasma. The linear electric field, together with free positive and negative charges upon which it may oppositely act, are responsible for the usefulness of this concept for accelerating particles. Very large directed currents of both positive and negative charges can be obtained. A fairly hot plasma is required, so that its conductivity results in flux diffusion times on the order of or greater than the compression time.

The device can be used advantageously as a pulsed electron source. If explosive restraint is used at both ends of shell 2 the negative current carriers (electrons) must be made to achieve sufficient energies to penetrate the conductor and exploding gases on the ends. In an alternative arrangement, the right hand end of shell 2 can be closed by thin conductor end plate 12 without explosive restraint (as illustrated in the drawing). Although end plate 12 would accelerate significantly during the explosion, it could be stopped later or the extracted electron beam bent magnetically out of its path. In this way it is possible to achieve greater intensities in pulsed electron beams than are possible by means of flash x-ray machines, the most intense source now available. Moreover, the pulse lengths expected from this explosive technique of many microseconds would exceed current durations sustainable in flash x-ray sources.

In another application of the device positive charges can be extractable as above using a thin end plate. For this application, a thin conducting end plate would be used with no explosive containment of that end. Although electrons would carry most of the current, even a fraction of a percent carried by light positive ions could result in very high currents. Under certain circumstances partial electron starvation may be achievable, permitting relatively more current to be carried by positive ions.

Utilization of the device of the invention for production of nuclear fusion reactions is also achievable in several ways. For instance, acceleration of deuterium ions of the plasma into a tritiated cathode, such as end plate 12, would produce 14-MeV neutrons via the DT reaction, of $D+T \rightarrow n+He^4$. Other nuclear reactions such as $D+D \rightarrow n+He^3$ may also be employed. It is noted that self-pinching and heating of the driven central plasma discharge should produce higher fusion yields than in conventional linear plasma discharges unaided by explosives.

While the invention has been described in one presently preferred embodiment, it is understood that the words which have been used have been words of description rather than words of limitation and that changes within the purview of the appended claims may be made without departing from the scope and spirit of the invention in its broader aspects.

What is claimed is:

1. An explosively driven plasma current generator comprising a cylindrical member of conductive material, means for generating a magnetic field within said cylindrical member, an end plate of conductive material connected to effect electrically and hermetically tight closure of one end of said cylindrical member, a partial end plate disposed within and spaced from the distal end of said cylindrical member effecting electrically tight closure thereof, insulating means disposed on the inner surface of said cylindrical member and in combination with said partial end plate effecting hermetically tight closure of the distal end of said cylindrical member, gas plasma disposed within said cylindrical member, explosive means disposed around the outer peripheral surface of said cylindrical member, and means for detonating said explosive means.

2. An explosively driven plasma current generator as defined in claim 1 including explosive means disposed on the outer surface of at least one end plate.

* * * * *